(12) United States Patent
Saito et al.

(10) Patent No.: US 7,294,660 B2
(45) Date of Patent: Nov. 13, 2007

(54) EPOXY RESIN COMPOSITION

(75) Inventors: Seiichi Saito, Tokyo (JP); Yoshihiro Fukuda, Tokyo (JP); Takahiro Mori, Tokyo (JP); Yoshinori Takahata, Tokyo (JP)

(73) Assignee: Asahi Denka Co., Ltd., Tokyo (JP)

( * ) Notice: Subject to any disclaimer, the term of this patent is extended or adjusted under 35 U.S.C. 154(b) by 499 days.

(21) Appl. No.: 10/518,008

(22) PCT Filed: Jun. 6, 2003

(86) PCT No.: PCT/JP03/07216

§ 371 (c)(1),
(2), (4) Date: Dec. 14, 2004

(87) PCT Pub. No.: WO03/106559

PCT Pub. Date: Dec. 24, 2003

(65) Prior Publication Data

US 2005/0176854 A1    Aug. 11, 2005

(30) Foreign Application Priority Data

Jun. 14, 2002   (JP) .............................. 2002-173650

(51) Int. Cl.
*C08K 3/38* (2006.01)
*C08L 63/00* (2006.01)
*C08L 63/02* (2006.01)

(52) U.S. Cl. ...................... 523/440; 523/427; 523/428; 523/445; 525/524

(58) Field of Classification Search ..................... None
See application file for complete search history.

(56) References Cited

U.S. PATENT DOCUMENTS 5,965,245 A * 10/1999 Okano et al. ................ 428/209
6,197,149 B1 * 3/2001 Kobayashi et al. .......... 156/305
6,348,523 B1 * 2/2002 Tachikawa et al. .......... 523/462

FOREIGN PATENT DOCUMENTS

| EP | 633295 | | 1/1995 |
| JP | 8-20671 | | 1/1996 |
| JP | 8-20708 | A * | 1/1996 |
| JP | 9-136372 | | 5/1997 |
| JP | 10-316428 | | 12/1998 |
| JP | 2000-239438 | | 9/2000 |
| JP | 2000-345103 | | 12/2000 |
| JP | 2001-354836 | | 12/2001 |
| JP | 2001-354836 | A * | 12/2001 |

* cited by examiner

*Primary Examiner*—Robert Sellers
(74) *Attorney, Agent, or Firm*—Young & Thompson

(57) ABSTRACT

An epoxy resin composition which comprises 100 parts by weight of an epoxy resin and 1 to 800 parts by weight of an aluminum borate whisker having an average fiber diameter of 0.25 μm or less. The epoxy resin composition contains a large amount of the aluminum borate whisker being dispersed uniformly therein, is excellent in mechanical strength, and is suppressed with respect to the anisotropy of a mechanical property due to the direction of application.

10 Claims, No Drawings

EPOXY RESIN COMPOSITION

TECHNICAL FIELD

The present invention relates to an epoxy resin composition containing fine aluminum borate whisker. More particularly, it relates to an epoxy resin composition characterized by containing aluminum borate whisker having an average fiber diameter of 0.25 μm or less, which exhibits small thermal expansion and small anisotropy of resin physical properties by the aluminum borate whisker. The epoxy resin composition is suitable as a curing resin for laminates, etc.

BACKGROUND ART

Aluminum borate whisker has a small coefficient of thermal expansion and is known to impart high mechanical strength to an epoxy resin. For example, JP-A-9-136372, JP-A-2000-239438, and JP-A-2000-345103 propose adding aluminum borate whisker to an epoxy resin composition. It has been considered that aluminum borate whisker having a diameter less than 0.3 μm is unfavorable for these applications in terms of dispersibility in a resin and applicability onto a substrate and that one having a diameter of about 0.3 to 3 μm is preferred as stated in JP-A-2000-345103.

If compounded with a large amount of aluminum borate whisker, however, an epoxy resin composition gains in viscosity and has difficulty being applied uniformly or provides a cured product with impaired mechanical properties, such as brittleness. Accordingly, aluminum borate whisker has been allowed to be added in an amount of, at the most, about 100 parts by weight per 100 parts by weight of an epoxy resin. It has therefore been demanded to find aluminum borate whisker that can provide an epoxy resin composition having superior physical properties even when incorporated in a large proportion.

When an epoxy resin composition containing aluminum borate whisker is applied to a substrate, the whisker is oriented in the direction of application. As a result, the cured epoxy resin composition exhibits different mechanical properties between in the direction of application and in the perpendicular direction thereto, which is disadvantageous for use in electronic circuit wiring boards. Therefore, it has been demanded to reduce such anisotropy of mechanical properties.

DISCLOSURE OF THE INVENTION

An object of the present invention is to provide an epoxy resin composition having a large amount of aluminum borate whisker uniformly dispersed therein, exhibiting superior mechanical properties with suppressed anisotropy along the direction of application.

In the light of the above-described circumstances, the present inventors have conducted extensive investigations. They have found as a result that aluminum borate whisker having an average fiber diameter of 0.25 μm or less is uniformly dispersible in an epoxy resin even in as high a ratio as about 200 parts by weight per 100 parts by weight of the epoxy resin to provide an epoxy resin composition exhibiting excellent mechanical strength with small variations in mechanical properties along the direction of application to a substrate, such as glass.

Completed based on the above findings, the present invention provides an epoxy resin composition comprising 100 parts by weight of an epoxy resin and 1 to 800 parts by weight of aluminum borate whisker having an average fiber diameter of 0.25 μm or less.

BEST MODE FOR CARRYING OUT THE INVENTION

The present invention will be described with reference to its preferred embodiments.

The epoxy resin that can be used in the invention includes any polyepoxy compounds with no particular limitation, such as aromatic epoxy compounds, alicyclic epoxy compounds, and aliphatic epoxy compounds.

The aromatic epoxy compounds include glycidyl ethers of polyhydric phenols, such as hydroquinone, resorcinol, bisphenol A, bisphenol F, 4,4'-dihydroxybiphenyl, novolak, and tetrabromobisphenol A.

The alicyclic epoxy compounds include polyglycidyl ethers of polyhydric alcohols having at least one alicyclic ring and cyclohexene oxide- or cyclopentene oxide-containing compounds obtained by epoxidizing cyclohexene ring- or cyclopentene ring-containing compounds with an oxidizing agent.

Specific examples are hydrogenated bisphenol A diglycidyl ether, (3,4-epoxycyclohexyl)methyl 3,4-epoxycyclohexylcarboxylate, 3,4-epoxy-1-methylcyclohexyl 3,4-epoxy-1-methylhexanecarboxylate, (6-methyl-3,4-epoxycyclohexyl)methyl 6-methyl-3,4-epoxycyclohexanecarboxylate, (3,4-epoxy-3-methylcyclohexyl)methyl 3,4-epoxy-3-methylcyclohexanecarboxylate, (3,4-epoxy-5-methylcyclohexyl)methyl 3,4-epoxy-5-methylcyclohexanecarboxylate, bis(3,4-epoxycyclohexylmethyl) adipate, methylenebis(3,4-epoxycyclohexane), 2,2-bis(3,4-epoxycyclohexyl)propane, dicyclopentadiene diepoxide, ethylenebis(3,4-epoxyyclohexanecarboxylate), dioctyl epoxyhexahydrophthalate, and di-2-ethylhexyl epoxyhexahydrophthalate.

The aliphatic epoxy compounds include polyglycidyl ethers of aliphatic polyhydric alcohols or alkylene oxide adducts thereof; polyglycidyl esters of aliphatic long-chain polybasic acids; homopolymers synthesized by vinyl polymerization of glycidyl acrylate or glycidyl methacrylate; and copolymers synthesized by vinyl polymerization of glycidyl acrylate or glycidyl methacrylate and other vinyl monomers. Typical examples include glycidyl ethers of polyhydric alcohols, such as 1,4-butanediol diglycidyl ether, 1,6-hexanediol diglycidyl ether, glycerol triglycidyl ether, trimethylolpropane triglycidyl ether, sorbitol tetraglycidyl ether, dipentaerythritol hexaglycidyl ether, polyethylene glycol diglycidyl ether, and polypropylene glycol diglycidyl ether; polyether polyol polyglycidyl ethers obtained by adding one or more alkylene oxides to aliphatic polyhydric alcohols, such as propylene glycol, trimethylolpropane, and glycerol; and diglycidyl esters of aliphatic long-chain dibasic acids. Also included are monoglycidyl ethers of aliphatic higher alcohols, monoglycidyl ethers of phenol, cresol, butyl phenol or a polyether alcohol thereof obtained by addition of an alkylene oxide, glycidyl esters of higher fatty acids, epoxidized soybean oil, octyl epoxystearate, butyl epoxystearate, and epoxidized polybutadiene.

The epoxy resin composition of the present invention contains one or more epoxy resins selected from the above-described polyepoxy compounds.

Of the recited polyepoxy compounds those having rubbery elasticity, such as epoxidized polybutadiene, are preferred; for they impart impact resistance to a cured product of the resulting epoxy resin composition. To impart impact resistance, the polyepoxy compound having rubbery elasticity is preferably used in an amount of 2% to 50% by weight, still preferably 2% to 30% by weight, particularly preferably 5% to 20% by weight, based on the total epoxy resin content of the epoxy resin composition.

Of the recited polyepoxy compounds epoxy compounds represented by general formula (I) shown below are preferred for obtaining an excellent cured product in terms of water resistance and softening point from the resulting epoxy resin composition. The epoxy compound represented by general formula (I) to be added is preferably 2% to 50% by weight, still preferably 3% to 40% by weight, particularly preferably 10% to 30% by weight, based on the total epoxy resin content of the epoxy resin composition. When added in amounts exceeding 50% by weight, the resulting resin composition tends to become hard and brittle.

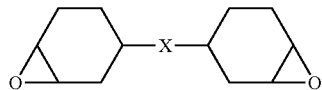

(I)

(wherein X represents an alkylene group having 1 to 4 carbon atoms or an alkylidene group having 2 to 8 carbon atoms.)

In general formula (I), the alkylene group having 1 to 4 carbon atoms represented by X includes methylene, ethylene, trimethylene, and tetramethylene. The alkylidene group having 2 to 8 carbon atoms represented by X includes ethylidene, propylidene, 2,2-propylidene, and butylidene.

The epoxy resin composition of the present invention preferably contains an epoxy resin curing agent in addition to the epoxy resin. Useful epoxy resin curing agents include latent curing agents, acid anhydrides, polyamine compounds, polyphenol compounds, and cationic photoinitiators.

The amount of the epoxy resin curing agent to be used in the epoxy resin composition of the invention is decided appropriately according to the epoxy equivalent of the epoxy resin and the reactive group equivalent of the epoxy resin curing agent. It is preferably 1 to 400 parts by weight, still preferably 10 to 300 parts by weight, particularly preferably 20 to 200 parts by weight, per 100 parts by weight of the epoxy resin.

The latent curing agents include dicyandiamides, hydrazides, imidazole compounds, amine adducts, sulfonium salts, onium salts, ketimines, acid anhydrides, and tertiary amines. These latent curing agents provide one pack type curing compositions, which are easy to handle.

The acid anhydrides include phthalic anhydride, trimellitic anhydride, pyromellitic anhydride, tetrahydrophthalic anhydride, hexahydrophthalic anhydride, maleic anhydride, and succinic anhydride.

The polyamine compounds include aliphatic polyamines such as ethylenediamine, diethylenetriamine, and triethylenetetramine; alicyclic polyamines such as menthene diamine, isophorone diamine, bis(4-amino-3-methylcyclohexyl)methane, bis(aminomethyl)cyclohexane, and 3,9-bis(3-aminopropyl) 2,4,8,10-tetraoxaspiro[5,5]undecane; aliphatic amines having an aromatic ring such as m-xylenediamine; and aromatic polyamines such as m-phenylenediamine, 2,2-bis(4-aminophenyl)propane, diaminodiphenylmethane, diaminodiphenylsulfone, α,α-bis(4-aminophenyl)-p-diisopropylbenzene.

The polyphenol compounds include phenol novolak, o-cresol novolak, t-butylphenol novolak, dicyclopentadienecresol, terpenediphenol, terpenedicatechol, 1,1,3-tris(3-t-butyl-4-hydroxy-6-methylphenyl)butane, and butylidenebis(3-t-butyl-4-hydroxy-6-methylphenyl). Phenol novolak is preferred of them; for it provides an epoxy resin composition of which electrical characteristics and mechanical strength are suitable to laminates.

The photoinitiators include benzophenone, phenyl biphenyl ketone, 1-hydroxy-1-benzoylcyclohexane, benzil, benzil dimethyl ketal, 1-benzil-1-dimethylamino-1-(4'-morpholinobenzoyl)propane, 2-morpholyl-2-(4'-methylmercapto)benzoylpropane, thioxanthone, 1-chloro-4-propoxythioxanthone, isopropylthioxanthone, diethylthioxanthone, ethylanthraquinone, 4-benzoyl-4'-methyldiphenyl sulfide, benzoin butyl ether, 2-hydroxy-2-benzoylpropane, 2-hydroxy-2-(4'-isopropylbenzoyl)propane, 4-butylbenzoyltrichloromethane, 4-phenoxybenzoyldichloromethane, methyl benzoylformate, 1,7-bis(9'-acridinyl)heptane, 9-n-butyl-3,6-bis(2'-morpholinoisobutyroyl)carbazole, 9-n-octyl-3,6-bis(2'-morpholinoisobutyroyl)carbazole, 2-methyl-4,6-bis(trichloromethyl)-s-triazine, 2-phenyl-4,6-bis(trichloromethyl)-s-triazine, 2-naphthyl-4,6-bis(-trichloromethyl)-s-triazine, 2-(N-n-butyl-3'-carbazolyl)-4,6-bis(trichloromethyl)-s-triazine, and 2-(N-(2"-methoxy-1"-methylethoxycarbonylmethyl)-3'-carbazolyl)-4,6-bis(trichloromethyl)-s-triazine.

These photoinitiators may be used in combination with one or more known photopolymerization accelerators such as benzoic acid compounds and tertiary amine compounds. The amount of the photoinitiator to be added is preferably 0.1% to 30% by weight based on the epoxy resin composition. Addition of less than 0.1% by weight tends to result in insubstantial effects, and addition of more than 30% by weight tends to result in reduction of mechanical strength of a cured product.

Known light sources can be used in polymerization using the photoinitiator, such as a high pressure mercury lamp, a metal halide lap, and a xenon lamp. On being irradiated with active energy rays such as ultraviolet rays, electron beams, X rays, radiation rays, and high frequencies, the photoinitiator produces a Lewis acid, which causes the epoxy resin to cure. Light sources having a wavelength of 400 nm or shorter are preferred.

The epoxy resin composition of the present invention has incorporated therein 1 to 800 parts by weight, preferably 200 to 600 parts by weight, still preferably 250 to 500 parts by weight, of aluminum borate whisker having an average fiber diameter of 0.25 μm or less per 100 parts by weight of the epoxy resin.

The aluminum borate whisker that can be used in the epoxy resin composition of the invention is not particularly limited as long as its average fiber diameter is 0.25 μm or less. The average fiber diameter of the aluminum borate whisker is preferably 0.001 to 0.25 μm, still preferably 0.001 to 0.2 μm, and the average fiber length is preferably 0.01 to 5 μm, still preferably 0.1 to 3 μm, particularly preferably 0.3 to 2 μm. Where the average fiber length is longer than 5 μm, there is a fear that the epoxy resin composition, when used in a printed circuit board, may fail to provide electrical insulation for the circuit.

The aluminum borate whisker preferably has an average fiber length to average fiber diameter ratio of 20/1 to 300/1, still preferably 20/1 to 100/1, particularly preferably 20/1 to 50/1. Aluminum borate whisker having an average fiber length to average fiber diameter ratio smaller than 20/1 tends to fail to exert sufficient reinforcing effects on the epoxy resin composition. Aluminum borate whisker having an average fiber length to average fiber diameter ratio greater than 300/1 tends to break during kneading and to give an epoxy resin composition whose strength widely varies.

If desired, the epoxy resin composition of the present invention can contain additives customarily employed in epoxy resin compositions, such as cure accelerators, resins other than epoxy resins, fillers, flame retardants, flame retardation assistants, other curing compounds, agents for improving screen printability, solvents, and dispersibility improvers.

The cure accelerators include triphenylphosphine, diazabicycloundecene, 2,4,6-tris(dimethylaminomethyl)phenol, and imidazole compounds, e.g., 2-ethyl-4-methylimidazole and 1-benzyl-2-methylimidazole. These cure accelerators can be used either individually or as a combination of two or more thereof. The cure accelerator is preferably used in a small amount and yet enough to accelerate curing of the epoxy resin.

The resins other than epoxy resins that can be used in the epoxy resin composition of the invention include those having high elasticity, such as butadiene rubber, nitrile rubber, butadiene-styrene rubber, acrylonitrile-butadiene rubber, acrylonitrile-butadiene-styrene rubber, and ethylene-propylene rubber. These resins are preferred in view of their mechanical strength which will improve the impact resistance, etc. of the epoxy resin composition.

The epoxy resin composition of the invention preferably contains an inorganic filler other than the aluminum borate whisker. Those fillers that can impart flame retardancy, heat resistance, moisture resistance or like functions to the epoxy resin composition are preferred. Such fillers include talc, silica, alumina, aluminum hydroxide, and magnesium hydroxide. These fillers can be used either individually or as a combination of two or more thereof Silica is particularly preferred of them because of its excellent electrical characteristics. The amount of the filler to be added is preferably 3 to 100 parts by weight, still preferably 5 to 50 parts by weight, particularly preferably 10 to 30 parts by weight, per 100 parts by weight of the epoxy resin.

The flame retardants include halogen-based flame retardants, including reactive ones, e.g., tetrabromobisphenol A and its derivatives, and additive ones, e.g., decabromodiphenyl ether; additive phosphorus-based flame retardants, such as triphenyl phosphate, phenol-resorcinol-phosphoric acid condensates, and 2,6-dimethylphenol-resorcinol-phosphoric acid condensates; nitrogen-based flame retardants, such as melamine cyanurate and melamine phosphate; and inorganic flame retardants, such as aluminum hydroxide and magnesium hydroxide. The amount of the flame retardant to be added is preferably 3 to 50 parts by weight, still preferably 5 to 40 parts by weight, particularly preferably 10 to 30 parts by weight, per 100 parts by weight of the epoxy resin.

Of the recited flame retardants it is preferred to use the phosphorus-based flame retardant having reactivity with an epoxy resin to give a cured epoxy resin composition having phosphorus atoms in its chemical structure. In particular, a compound represented by general formula (II) shown below is preferred for its high flame retardation and small adverse influences on the physical properties of the epoxy resin, such as a reduction in glass transition temperature.

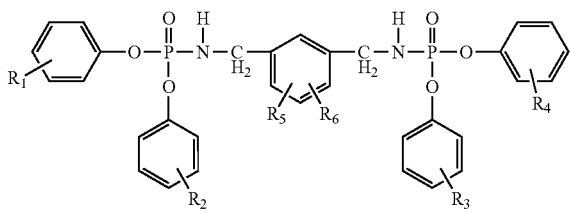

(II)

(wherein $R_1$, $R_2$, $R_3$, and $R_4$ each represent a hydrogen atom, a hydroxyl group or an alkyl group having 1 to 4 carbon atoms; and $R_5$ and $R_6$ each represent a hydrogen atom or an alkyl group having 1 to 4 carbon atoms.)

In general formula (II), the alkyl group having 1 to 4 carbon atoms represented by $R_1$, $R_2$, $R_3$, $R_4$, $R_5$, and $R_6$ includes methyl, ethyl, propyl, and butyl.

The flame retardation assistants include antidripping agents, such as polytetrafluoroethylene and silicone polymers, and antimony trioxide.

The epoxy resin composition of the present invention can be diluted with an appropriate solvent, such as propylene glycol monomethyl ether, into varnish, which can be infiltrated into a porous glass substrate, such as glass nonwoven fabric or glass woven fabric, followed by heating to produce prepregs in a usual manner. A plurality of the thus produced prepregs are stacked, and a copper foil is superposed on one or both sides of the resulting laminate, followed by pressing under heat, to provide a copper-clad epoxy-glass laminate. Where no copper foil is used, the product is a laminated sheet. After a circuit pattern is printed on the copper-clad epoxy-glass laminate (inner laminate), the unnecessary part of the copper is etched out. Another prepreg and a copper foil are superposed on one or both sides of the inner laminate, and the resulting laminate is heat pressed at 170° C. under a pressure of 40 kg/cm² for 90 minutes in a usual manner to produce a multilayer laminated plate. A printed circuit board is produced in a usual manner by making through-holes through the copper-clad laminate or the multilayer laminated plate, plating the inner wall of the through-holes, and forming a prescribed circuit.

The present invention will now be illustrated in greater detail with reference to Examples, but it should be understood that the invention is not construed as being limited thereto.

EXAMPLES 1 TO 7 AND COMPARATIVE EXAMPLES 1 AND 2

The components of the composition shown in Tables 1 and 2 were thoroughly mixed to prepare an epoxy resin composition. The viscosity of the resulting epoxy resin composition was measured in accordance with the method described below. The epoxy resin composition was applied to an area of 10 cm×10 cm of a surface-treated aluminum plate with a knife coater to a dry thickness of 30 μm, dried at 80° C. for 5 minutes, and baked at 150° C. for 30 minutes to obtain a cured product. The cured product was evaluated for flame retardancy, glass transition temperature, peel strength, and linear expansion coefficient in accordance with the methods of measurements described below. The results of measurements are shown in Tables 1 and 2.

Methods of Measurements:

1) Viscosity

Measured at 25° C. and 0.5 rpm with E-type viscometer.

2) Flame Retardancy (Inflammability)

Evaluated in accordance with UL-94.

3) Glass Transition Temperature (Tg)

Measured by dynamic viscoelasticity measurement.

4) Peel Strength

Measured in accordance with JIS C6481.

5) Linear Expansion coefficient

A 2 cm wide and 10 cm long strip specimen parallel with the direction of application (hereinafter "direction X") and a 2 cm wide and 10 cm long strip specimen parallel with the perpendicular direction to the direction of application (hereinafter "direction Y") were cut out of the cured products per sample. The linear expansion coefficient of each specimen was measured to obtain the ratio of the linear expansion coefficient in direction X to that in direction Y, i.e., X/Y ratio.

The compounds shown in Tables 1 and 2 (epoxys 1 through 5, curing agents A and B, fillers 1 through 6, flame retardants a and b, solvent, and cure accelerator) were as follows.

Epoxy 1:

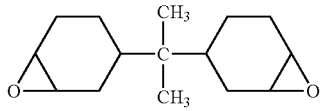

Epoxy 2:

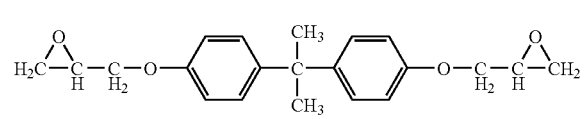

Epoxy 3:

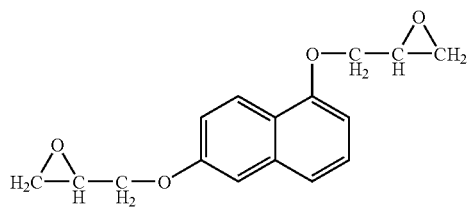

Epoxy 4:

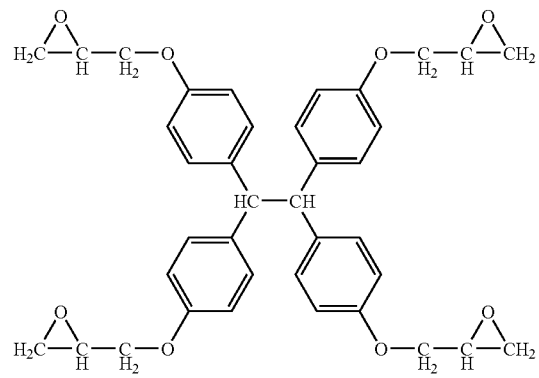

Epoxy 5:

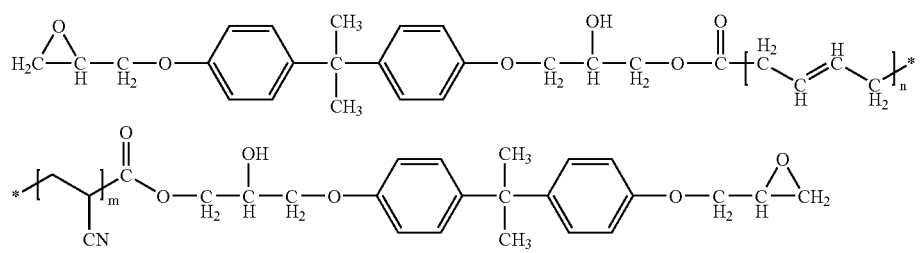

Curing Agent A: PR-53194 (Produced by Sumitomo Bakelite Co., Ltd.)

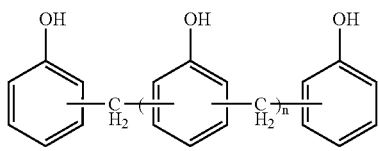

Curing Agent B: Milex XLC-LL (Produced by Mitsui Chemicals, Inc.)

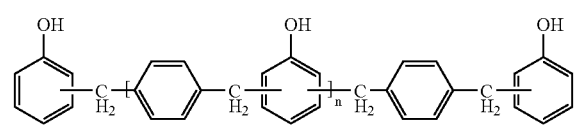

Filler 1: Aluminum borate whisker, average fiber diameter: 0.15 μm; average fiber length: 3 μm Filler 2: Aluminum borate whisker; average fiber diameter: 0.05 μm; average fiber length: 1.5 μm Filler 3: Aluminum borate whisker; average fiber diameter: 0.002 μM; average fiber length: 0.5 μm Filler 4: Aluminum borate whisker; average fiber diameter: 0.5 μm; average fiber length: 10 μm Filler 5: Aluminum hydroxide Filler 6: Silica Flame Retardant a:

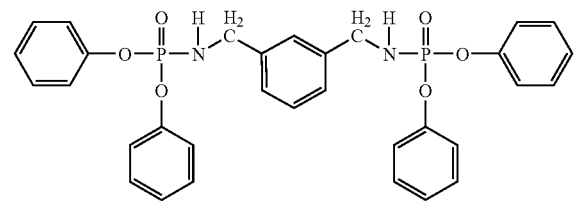

Flame Retardant b:

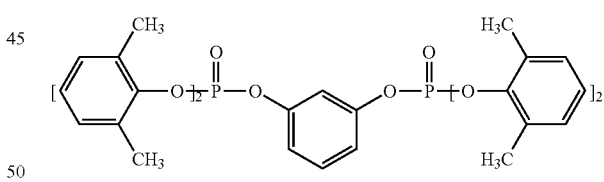

Solvent: Ethylene glycol butyl ether acetate

Cure accelerator: 2-Ethyl-4-ethylimidazole

TABLE 1

|  | Example 1 | Example 2 | Example 3 | Example 4 | Example 5 |
|---|---|---|---|---|---|
| Composition (part by weight) | | | | | |
| Epoxy 1 | 20 | 20 | 20 | 20 | 20 |
| Epoxy 2 | | | 40 | | |
| Epoxy 3 | 70 | 40 | | 70 | 70 |
| Epoxy 4 | | 30 | 30 | | |
| Epoxy 5 | 10 | 10 | 10 | 10 | 10 |
| Curing agent A | 38.4 | 37.0 | 36.2 | 38.4 | 38.4 |
| Curing agent B | 38.4 | 37.0 | 36.2 | 38.4 | 38.4 |
| Filler 1 | 39.2 | 38.6 | 38.8 | 97.9 | 391.8 |
| Filler 2 | | | | | |
| Filler 3 | | | | | |
| Filler 4 | | | | | |
| Filler 5 | 14.7 | 14.5 | 14.4 | 14.7 | 14.7 |
| Filler 6 | 9.8 | 9.6 | 9.7 | 9.8 | 9.8 |
| Flame retardant a | 19.2 | 19.0 | | 19.2 | 19.2 |
| Flame retardant b | | | 21.6 | | |
| Solvent | 259.7 | 255.7 | 257.0 | 318.4 | 612.3 |
| Cure accelerator | 4.5 | 4.4 | 3.8 | 4.5 | 4.5 |
| Results of Measurement | | | | | |
| Viscosity (cps) | 700 | 850 | 950 | 1800 | 2500 |
| Tg (° C.) | 175 | 190 | 180 | 177 | 180 |
| Peel strength (kg/cm) | 1.2 | 1.1 | 1.2 | 1.0 | 1.0 |
| Linear Expansion Coefficient X direction (ppm) | 50.0 | 45.0 | 47.0 | 20.0 | 10.0 |
| Linear Expansion Coefficient Y direction (ppm) | 54.0 | 50.0 | 51.0 | 22.0 | 11.0 |
| Linear Expansion Coefficient X/Y ratio | 0.93 | 0.90 | 0.92 | 0.91 | 0.91 |
| Inflammability | V-0 | V-0 | V-0 | V-0 | V-0 |

TABLE 2

|  | Example 6 | Example 7 | Comp. Example 1 | Comp. Example 2 |
|---|---|---|---|---|
| Composition (part by weight) | | | | |
| Epoxy 1 | 20 | 20 | 20 | 20 |
| Epoxy 2 | | | | |
| Epoxy 3 | 70 | 70 | 70 | 70 |
| Epoxy 4 | | | | |
| Epoxy 5 | 10 | 10 | 10 | 10 |
| Curing agent A | 38.4 | 38.4 | 38.4 | 38.4 |
| Curing agent B | 38.4 | 38.4 | 38.4 | 38.4 |
| Filler 1 | | | | |
| Filler 2 | 391.8 | | | |
| Filler 3 | | 587.7 | | |
| Filler 4 | | | 39.2 | 97.9 |
| Filler 5 | | | 14.7 | 14.7 |
| Filler 6 | | | 9.8 | 9.8 |
| Flame retardant a | 19.2 | 19.2 | 19.2 | 19.2 |
| Flame retardant b | | | | |
| Solvent | 612.3 | 808.2 | 259.7 | 318.4 |
| Cure accelerator | 4.5 | 4.5 | 4.5 | 4.5 |
| Results of Measurement | | | | |
| Viscosity (cps) | 1500 | 1000 | 5000 | 98000 |
| Tg (° C.) | 175 | 185 | 175 | 177 |
| Peel strength (kg/cm) | 1.0 | 1.0 | 0.6 | 0.4 |
| Linear Expansion Coefficient X direction (ppm) | 11.0 | 7.5 | 45.0 | 18.0 |
| Linear Expansion Coefficient Y direction (ppm) | 12.0 | 7.8 | 59.0 | 26.0 |
| Linear Expansion Coefficient X/Y ratio | 0.92 | 0.96 | 0.76 | 0.69 |
| Inflammability | V-0 | V-0 | V-0 | V-0 |

INDUSTRIAL APPLICABILITY

The present invention provides an epoxy resin composition containing aluminum borate whisker having a specific average fiber diameter. The composition has low linear expansion with reduced anisotropy in linear expansion, a high glass transition temperature, and high peel strength and is suitable as a curing resin for laminates.

The invention claimed is:

1. An epoxy resin composition comprising 100 parts by weight of an epoxy resin and 1 to 800 parts by weight of aluminum borate whisker having an average fiber diameter of 0.25 μm or less.

2. The epoxy resin composition according to claim 1, wherein the aluminum borate whisker has an average fiber diameter of 0.001 to 0.25 μm.

3. The epoxy resin composition according to claim 1, wherein the aluminum borate whisker has an average fiber length of 0.01 to 5 μm.

4. The epoxy resin composition according to claim 1, wherein the aluminum borate whisker has an average fiber length to average fiber diameter ratio of 20/1 to 300/1.

5. The epoxy resin composition according to claim 1, wherein the epoxy resin comprises at least one polyepoxy compound and contains 2 to 50% by weight of a polyepoxy compound having rubbery elasticity based on the total epoxy resin content.

6. The epoxy resin composition according to claim 5, wherein the polyepoxy compound having rubbery elasticity is epoxidized polybutadiene.

7. The epoxy resin composition according to claim 1, wherein the epoxy resin comprises 2 to 50% by weight of an epoxy compound represented by general formula (I) based on the total epoxy resin content:

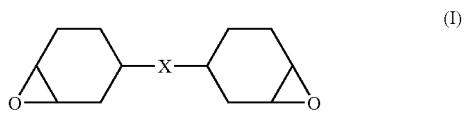

(I)

(wherein X represents an alkylene group having 1 to 4 carbon atoms or an alkylidene group having 2 to 8 carbon atoms).

8. The epoxy resin composition according to claim 1, wherein the aluminum borate whisker is present in an amount of 200 to 600 parts by weight.

9. The epoxy resin composition according to claim 1, which further comprises 3 to 50 parts by weight of a flame retardant.

10. The epoxy resin composition according to claim 9, wherein the flame retardant is a phosphorus-based flame retardant having reactivity with the epoxy resin.

* * * * *